(No Model.) 2 Sheets—Sheet 1.
S. CRIPE.
DISH CLEANER.
No. 556,005. Patented Mar. 10, 1896.
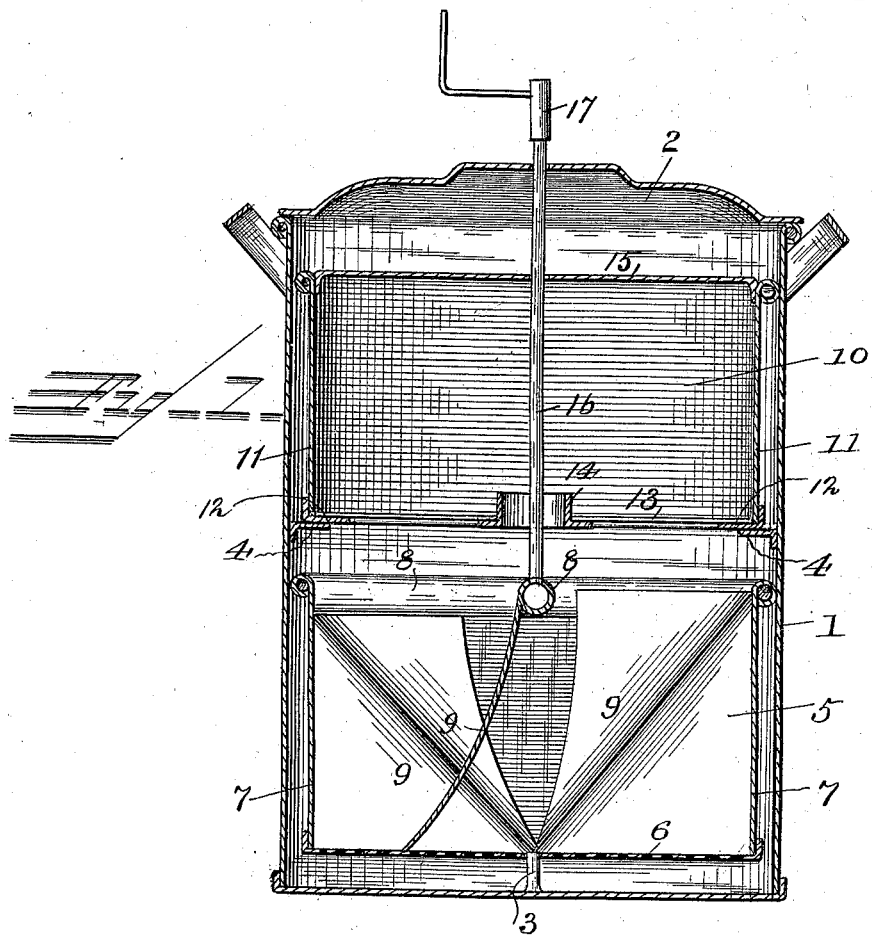
WITNESSES
F. L. Ourand
A. D. Suit
INVENTOR
Samuel Cripe
By H. B. Willson
Attorney

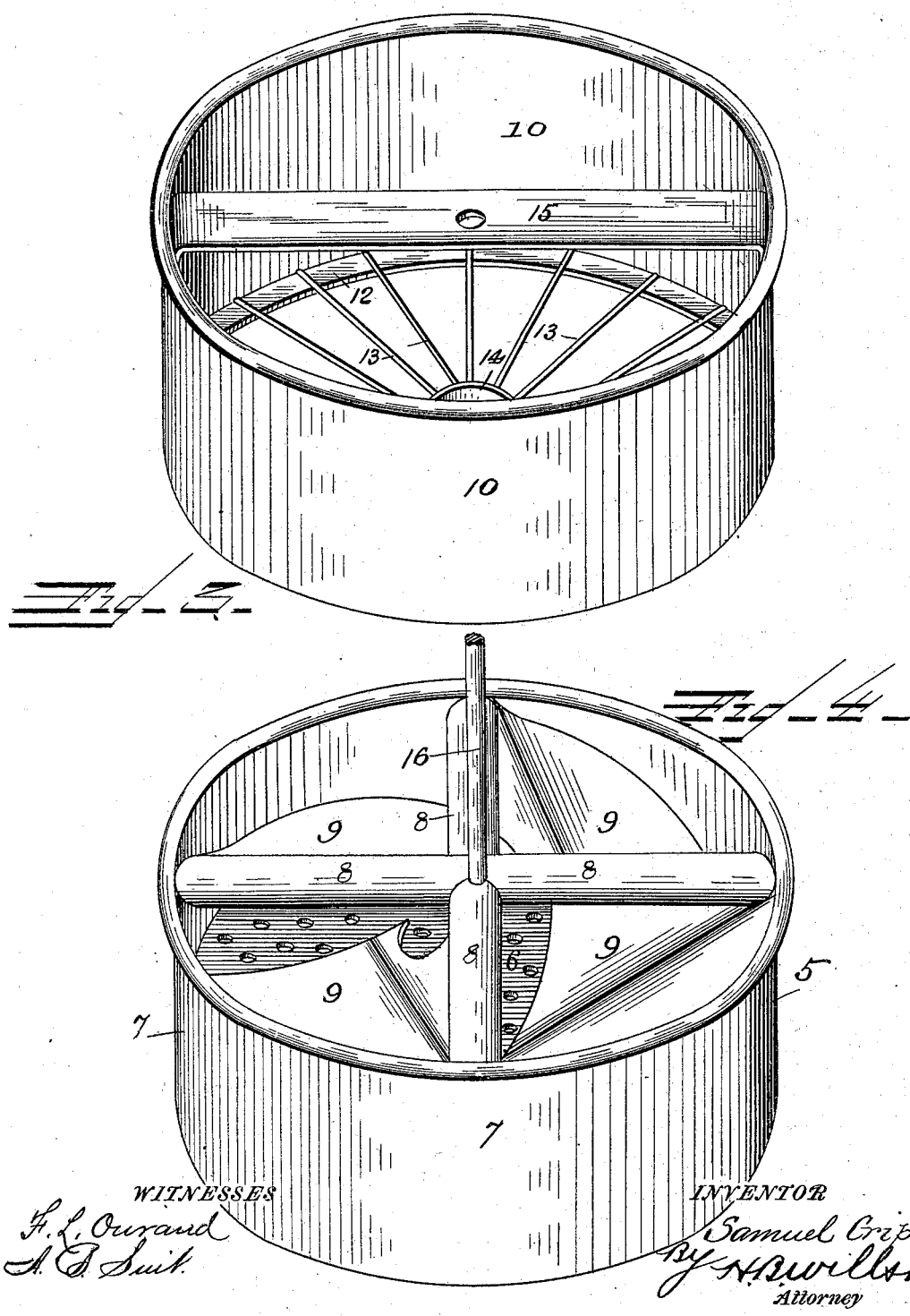

UNITED STATES PATENT OFFICE.

SAMUEL CRIPE, OF KOKOMO, INDIANA.

DISH-CLEANER.

SPECIFICATION forming part of Letters Patent No. 556,005, dated March 10, 1896.

Application filed June 24, 1895. Serial No. 553,856. (No model.)

*To all whom it may concern:*

Be it known that I, SAMUEL CRIPE, a citizen of the United States, residing at Kokomo, in the county of Howard and State of Indiana, have invented certain new and useful Improvements in Dish-Washers; and I do declare the following to be a full, clear, and exact description of the invention, such as will enable others skilled in the art to which it appertains to make and use the same.

My invention relates to dish-washers.

The object of the invention is to provide a dish-washer which shall be simple of construction, durable in use and comparatively inexpensive of production, and which will effectively cleanse the dishes.

With these objects in view the invention consists of certain features of construction and combination of parts, which will be hereinafter fully described and claimed.

In the accompanying drawings, Figure 1 is a vertical sectional view of my improved dish-washer. Fig. 2 is a top plan view with the cover removed. Fig. 3 is a detail perspective view of the dish-receptacle. Fig. 4 is a similar view of the dasher.

In the drawings, 1 denotes the outer shell or casing, and 2 denotes its cover.

3 denotes the bearing-lug secured centrally in the bottom of the casing, and 4 denotes the supporting-ears secured to the interior sides of the casing about midway between its upper and lower ends.

5 denotes the dasher located in said casing. This dasher comprises a flat horizontal perforated bottom 6, circular rim 7, cross-bars 8 and blades 9. Each of these blades extend from the cross-bar in an inclined direction and are secured to the horizontal bottom, and are provided with a suitable twist or curve to direct the water contained within the dasher upward. In the present instance I have shown four blades, but it is evident that more or less may be employed without departing from the spirit of my invention.

10 denotes the dish-receptacle, which consists of an annular rim 11, having an inwardly-projecting flange 12 at its lower end, upon which are supported the outer ends of radiating rods 13, the inner ends of which are secured to a hub 14. A cross-bar 15 extends entirely across the dish-receptacle and is secured to the inner sides thereof and serves as a handle, by means of which the receptacle may be removed from the outer shell or casing. A shaft 16 is secured to the dasher and projects centrally upward and through a hole in the cross-bar of the dish-receptacle and a similar hole in the shell or casing top, and is adapted to be rotated by a crank 17. Other means, however, may be employed in lieu of this crank for rotating the shaft without departing from the spirit of my invention.

In operation the dishes are placed in the dish-receptacle and supported by the bottom formed by the radiating rods, and water is poured over the dishes and will fall into the dasher. The cover is placed upon the shell or casing, and the dasher is rotated by the crank. This rotation will cause the water contained within the dasher to be violently thrown upward against the dishes by the dasher-blades, thus very effectively cleansing the dishes contained in the receptacle. After the dishes have been thoroughly cleansed the rotation may be discontinued and the water on the dishes may now drain off, after which the dishes may be removed by grasping the cross-bar and raising the receptacle from the shell or casing.

The device is exceedingly simple and effective and may be placed upon the market at a small cost, thus placing it within the reach of all classes.

Having thus described my invention, what I claim, and desire to secure by Letters Patent, is—

The combination with an outer shell or casing, with an upwardly-projecting lug in its bottom and with supporting-flanges intermediate its ends, a dasher consisting of a perforated bottom, a rim, cross-bars secured to the upper edge of the rim, and blades secured to the cross-bars and secured to the bottom and curved transversely, and a dish-receptacle located above the dasher and supported upon the flanges of the shell or casing, a cover for the shell or casing, a shaft secured to and projecting upward through the cover, and means for rotating the shaft, substantially as set forth.

In testimony whereof I affix my signature in presence of two witnesses.

SAMUEL CRIPE.

Witnesses:
L. H. HILLIS,
DANIEL A. WOODS.